(12) United States Patent
Fujino

(10) Patent No.: US 6,476,935 B1
(45) Date of Patent: Nov. 5, 2002

(54) DATA COMMUNICATION APPARATUS AND COMMUNICATION CONTROL METHOD

(75) Inventor: Toru Fujino, Urawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/164,275

(22) Filed: Oct. 1, 1998

(30) Foreign Application Priority Data

Oct. 2, 1997 (JP) .............................................. 9-270135
Sep. 28, 1998 (JP) .......................................... 10-273692

(51) Int. Cl.$^7$ ................................................. H04N 1/00
(52) U.S. Cl. ........................ 358/400; 358/405; 358/407; 379/100.09
(58) Field of Search ................................ 358/400, 444, 358/403, 448, 404, 408, 434, 442, 407, 405, 1.15, 409, 411, 1.16, 1.9; 379/100.01, 114, 115, 100.09; 709/101, 100, 223, 107

(56) References Cited

U.S. PATENT DOCUMENTS

| | | | | |
|---|---|---|---|---|
| 4,573,083 A | * | 2/1986 | Shimizu | 340/825.52 |
| 4,586,086 A | * | 4/1986 | Ohzeki | 358/405 |
| 5,050,208 A | * | 9/1991 | Wada | 379/100.09 |
| 5,079,767 A | * | 1/1992 | Perlman | 370/256 |
| 5,134,502 A | * | 7/1992 | Nakatsuma | 358/434 |
| 5,146,348 A | * | 9/1992 | Kaneyama | 358/407 |
| 5,191,604 A | * | 3/1993 | Shigeeda | 379/161 |
| 5,276,732 A | * | 1/1994 | Stent et al. | 379/93 |
| 5,278,836 A | * | 1/1994 | Iimura et al. | 370/112 |
| 5,287,199 A | * | 2/1994 | Zoccolillo | 358/400 |
| 5,291,305 A | * | 3/1994 | Sakashita et al. | 358/444 |
| 5,428,457 A | * | 6/1995 | Okumura et al. | 358/403 |
| 5,522,041 A | * | 5/1996 | Murakami et al. | 395/200.01 |
| 5,712,712 A | * | 1/1998 | Sayward | 358/403 |
| 5,719,688 A | * | 2/1998 | Kagami | 358/468 |
| 5,734,654 A | * | 3/1998 | Shirai et al. | 370/396 |
| 5,757,511 A | * | 5/1998 | Kaneyama | 358/403 |
| 5,764,914 A | * | 6/1998 | Goto et al. | 709/227 |
| 5,790,640 A | * | 8/1998 | Tassa et al. | 379/100.15 |
| 5,801,839 A | * | 9/1998 | Ochiai | 358/404 |
| 5,812,279 A | * | 9/1998 | Fukushima et al. | 358/404 |
| 5,812,930 A | * | 9/1998 | Zavrel | 455/5.1 |
| 5,872,929 A | * | 2/1999 | Naito | 395/200.53 |
| 5,960,247 A | * | 9/1999 | Morikawa | 399/382 |
| 5,973,791 A | * | 10/1999 | Yamamuro et al. | 358/403 |
| 6,014,704 A | * | 1/2000 | Fischer et al. | 709/230 |
| 6,023,346 A | * | 2/2000 | Yasmoto | 358/434 |
| 6,057,938 A | * | 5/2000 | Abe et al. | 358/400 |
| 6,085,101 A | * | 7/2000 | Jain et al. | 455/500 |
| 6,097,505 A | * | 8/2000 | Miwa et al. | 358/434 |
| 6,124,947 A | * | 9/2000 | Seo | 358/405 |
| 6,134,017 A | * | 10/2000 | Schlank et al. | 358/1.15 |
| 6,157,463 A | * | 12/2000 | Kitagawa | 358/400 |
| 6,198,815 B1 | * | 3/2001 | Mishima | 379/355 |

FOREIGN PATENT DOCUMENTS

| JP | 05136906 | * | 6/1993 | H04M/11/00 |
|---|---|---|---|---|
| JP | 05227403 | * | 9/1993 | H04N/1/32 |

* cited by examiner

*Primary Examiner*—Edward Coles
*Assistant Examiner*—Tia A Carter
(74) *Attorney, Agent, or Firm*—Fitzpatrick, Cella, Harper & Scinto

(57) ABSTRACT

Upon simultaneously transmitting identical data to a plurality of destinations, a plurality of line control means prepared in units of lines independently transmit data with reference to transmission management means commonly used by these line control means. The transmission management means commonly used manages an image file, and includes a table for managing at least destinations.

17 Claims, 16 Drawing Sheets

FIG. 3

| DESTINATION DATA MANAGEMENT TABLE | | | | ~301 |
|---|---|---|---|---|
| IMAGE DATA START ADDRESS | | | | ~302 |
| BUSY INDICATION SWITCH | | | | ~303 |
| LINE 1 | LINE 2 | LINE 3 | LINE 4 | |
| 1 | 0 | 1 | 1 | |

COMMUNICATION MANAGEMENT TASK

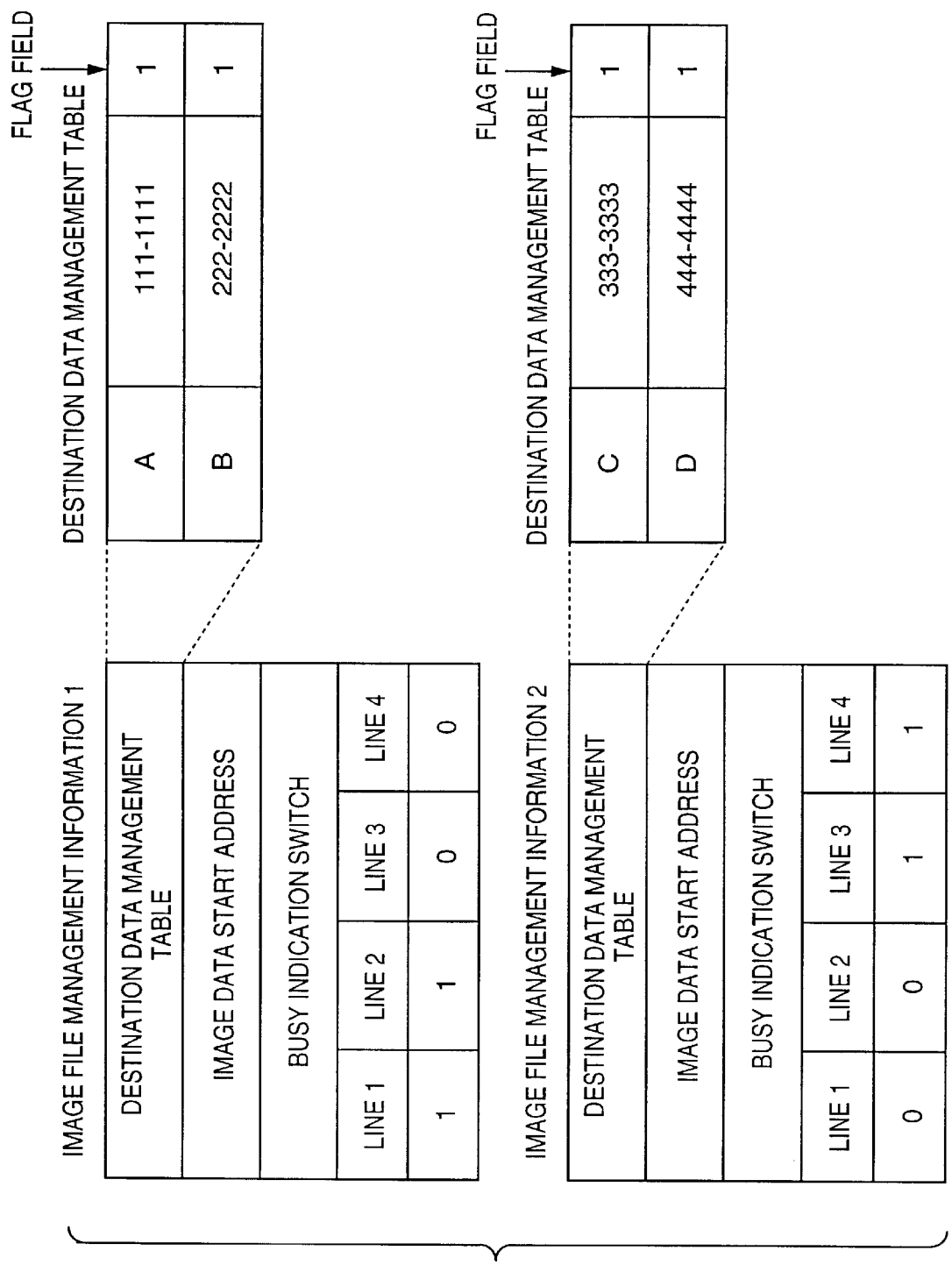
F I G. 10

FIG. 12

DESTINATION DATA MANAGEMENT TABLE

FLAG FIELD →

| | | |
|---|---|---|
| C | 333-3333 | 1 |
| D | 444-4444 | 1 |

IMAGE FILE MANAGEMENT INFORMATION 2

| DESTINATION DATA MANAGEMENT TABLE | | | |
|---|---|---|---|
| IMAGE DATA START ADDRESS | | | |
| BUSY INDICATION SWITCH | | | |
| LINE 1 | LINE 2 | LINE 3 | LINE 4 |
| 0 | 0 | 1 | 1 |

FIG. 15

| | | DETAILED INFORMATION : SET | END : RETURN |
|---|---|---|---|
| 9 : 00 | A | TRANSMISSION | P. 003 |
| 9 : 01 | B | TRANSMISSION | P. 003 |
| 10 : 00 | C | TRANSMISSION | P. 002 |
| 10 : 01 | D | TRANSMISSION | P. 001 |
| COMMUNICATION RESULT | ▲ | ▼ | ABORT |

TRANSMISSION START TIME    DESTINATION    TRANSMISSION OR RECEPTION    NUMBER OF PAGES

FIG. 16

ABORT COMMUNICATION?

| YES | NO |
|---|---|

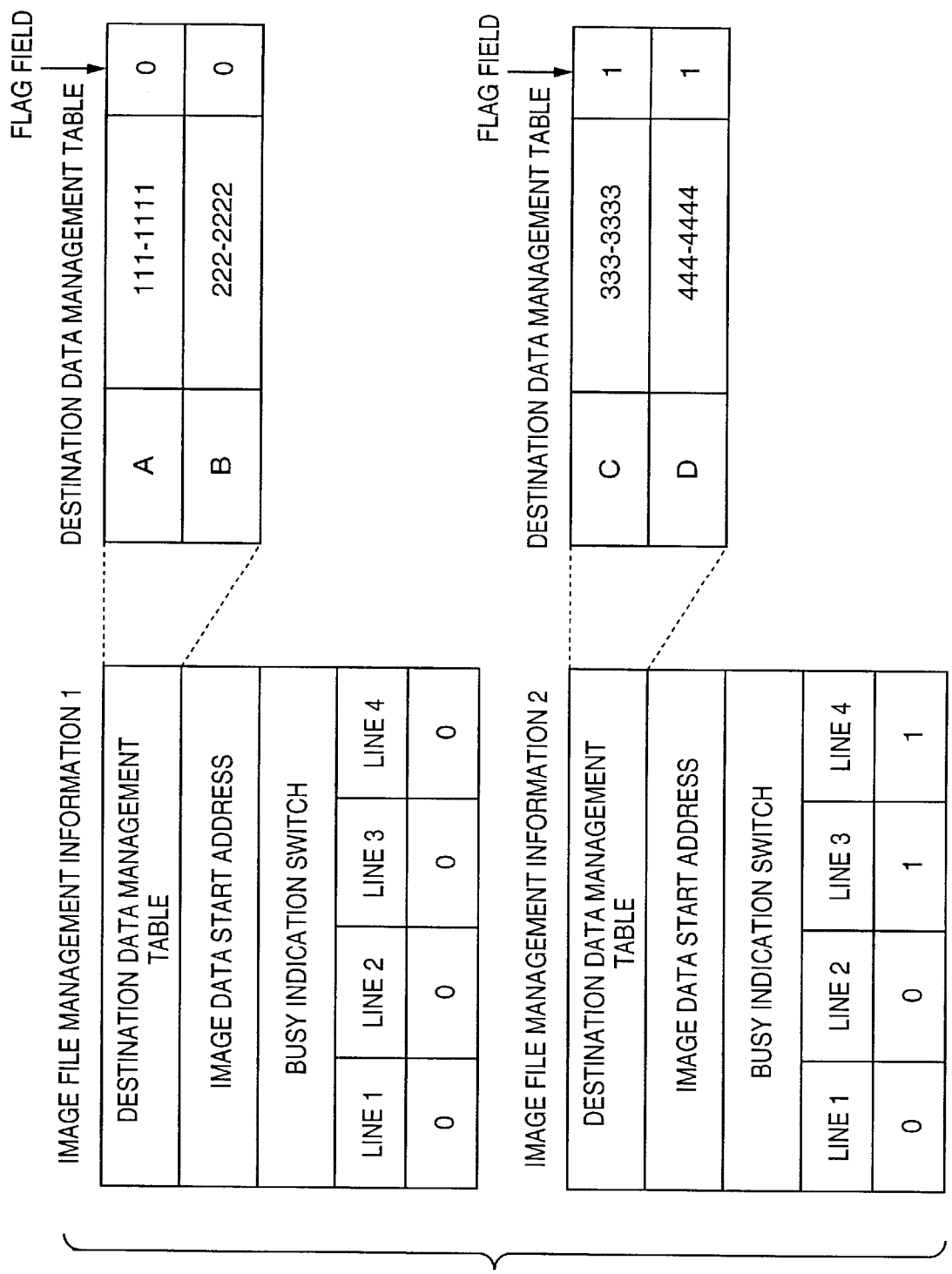
F I G. 17

DATA COMMUNICATION APPARATUS AND COMMUNICATION CONTROL METHOD

BACKGROUND OF THE INVENTION

The present invention relates to a data communication apparatus and communication control method and, more specifically, to a facsimile apparatus which can connect a plurality of lines or data channels, and its communication control method or the like.

A conventional facsimile apparatus as one of data communication apparatuses has one and only line connection control means for connecting a line, or cannot simultaneously transmit an identical image file to a plurality of destinations even when it has a plurality of line connection control means.

In order to simultaneously transmit an identical image file to more than one destination, a switch fabric, e.g., subscription to a store and forward switching service, other than the facsimile main body must be used.

For this reason, in case of multicast transmission for transmitting a single original image to a plurality of destinations, when the facsimile apparatus has only one line connection control means, it can perform only sequential multicast transmission for transmitting that image in turn to the individual destinations, and the time corresponding to the number of destinations is required until the image is transmitted to all the destinations.

Even when the facsimile apparatus can be connected to a line such as an ISDN network having a plurality of information channels, since it performs similar sequential multicast transmission, this results in similar disadvantages.

In order to use an external store and forward switching service, another resource is necessary, and cost and labor are required to achieve the objective.

SUMMARY OF THE INVENTION

The present invention has been made to solve the above-mentioned problem, and has as its object to provide a data communication apparatus and communication control method, which can improve communication efficiency since a plurality of line tasks use common management information upon simultaneously transmitting identical data to a plurality of destinations.

It is another object of the present invention to provide a data communication apparatus and communication control method, which can automatically abort communications via a plurality of lines when the user instructs to abort communications during multicast transmission.

Other objects of the present invention will become apparent from the following detailed description taken in conjunction with the accompanying drawings.

In order to achieve the above objects, according to the present invention, there is provided a data communication apparatus wherein a plurality of line control means, prepared in units of lines, independently make data transmission with reference to transmission management means commonly used by the plurality of line control means upon simultaneously transmitting identical data to a plurality of destinations.

According to one aspect of the present invention, there is provided a communication control method wherein a communication control task includes at least a communication management task and a plurality of line control tasks prepared in units of communication lines, and control operations executed by the plurality of line control tasks independently and simultaneously transmit identical data to a plurality of destinations using management information generated by the communication management task.

According to another aspect of the present invention, there is provided a communication control method comprising: the step of detecting a plurality of destinations of data; the step of informing a plurality of line control tasks of management information; the step of detecting completion of communications by the plurality of line control tasks; and the step of deleting a transmission data file upon completion of the communications.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a logic table showing image file management information;

FIG. 10 shows tables that respectively indicate the states of image file management information 1 and image file management information 2 during transmission of image file 2;

FIG. 12 shows tables that indicate the state of image file management information 2 upon completion of transmission for destinations A and B;

FIG. 15 shows the display of line states during communications;

FIG. 16 shows a confirmation message upon aborting communications; and

FIG. 17 shows tables that respectively indicate the states of image file management information 1 and image file management information 2 upon aborting communications.

DETAILED DESCRIPTION OF THE PREFERRED EMBODIMENTS

The preferred embodiments of the present invention will be described in detail hereinafter with reference to the accompanying drawings.

The embodiments to be described hereinafter will exemplify a facsimile apparatus which selects a line to be connected from a plurality of lines, and makes facsimile communications by sending the digits of the called number onto the selected line, as a data communication apparatus. Also, the present invention can be applied to other data communication terminals having modems.

First Embodiment

Figure 1:
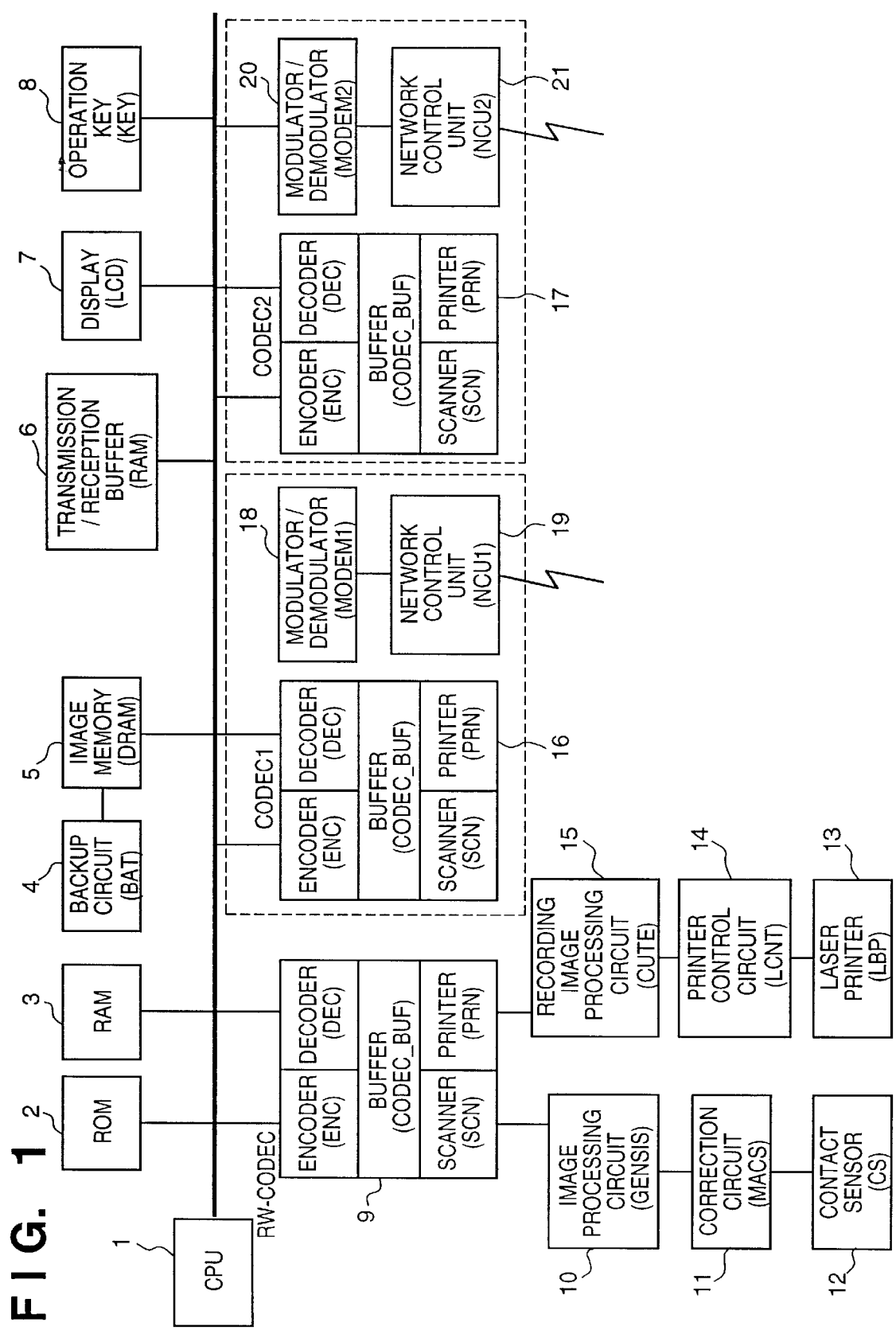
FIG. 1 is a block diagram showing the arrangement of a facsimile apparatus according to the first embodiment of the present invention.

FIG. 1 shows the system arrangement of a facsimile apparatus of this embodiment. Referring to FIG. 1, reference numeral 1 denotes a central processing unit (CPU), which controls the overall apparatus in accordance with the contents of a program stored in a ROM (to be described later). The program is divided into operation units called tasks in units of functions, and the execution order of tasks is managed by a program called an operating system (OS) similarly stored in the ROM so as to realize pseudo parallel processes. Operations to be described later are implemented by the individual tasks.

Reference numeral 2 denotes a ROM for storing the program for the CPU 1, various control data, and the like. Reference numeral 3 denotes a RAM which is a memory including a work area used upon control by the CPU 1, a line selection management table (to be described later), and the like. Reference numeral 4 denotes an image memory backup circuit (BAT), which backs up an image memory (to be described below). Reference numeral 5 denotes an image memory (DRAM) which is a memory for storing image data. Reference numeral 6 denotes a transmission reception buffer (RAM) for storing image data to be transmitted or received. Reference numeral 7 denotes a display (LCD) for displaying the operation conditions and the like of the apparatus. Reference numeral 8 denotes an operation key (KEY) which is used for various setups.

Reference numeral 9 denotes a reading/recording encoding/decoding device (RW-CODEC), which includes an encoder (ENC), decoder (DEC), buffer (CODEC_BUF), scanner (SCN), and printer (PRN). Reference numeral 10 denotes an image processing circuit (GENESIS) which performs binarization and image conversion. Reference numeral 11 denotes a correction circuit (MACS) which performs shading correction and the like. Reference numeral 12 denotes a contact sensor (CS) for reading an original. Reference numeral 13 denotes a laser printer (LBP) for forming a visible image. Reference numeral 14 denotes a printer control circuit (LCNT) for controlling the laser printer (LBP) 13. Reference numeral 15 denotes a recording image processing circuit (CUTE) which performs correction, image conversion, and the like.

Reference numeral 16 denotes a communication encoding/decoding device (C-CODEC1), which includes an encoder (ENC), decoder (DEC), buffer (CODEC_BUF), scanner (SCN), and printer (PRN), and builds a transmission/reception circuit together with a modulator/demodulator (MODEM1) 18 and network control unit (NCU1) 19. Reference numeral 17 denotes a communication encoding/decoding device (C-CODEC2), which has the same arrangement as that of the communication encoding/decoding device (C-CODEC1) 16, and builds another transmission/reception circuit together with a modulator/demodulator (MODEM2) 20 and network control unit (NCU2) 21. With this arrangement, this embodiment can independently perform transmission and reception.

An operation for reading an original in the facsimile apparatus with the aforementioned arrangement will be explained first. The contact sensor (CS) 12 reads an original image, and its image signal is subjected to processing such as shading correction and the like by the correction circuit (MACS) 11. The image processing circuit (GENESIS) 10 performs binarization and image conversion of that image signal, and serially inputs the processed image signal to the scanner (SCN) of the reading/recording encoding/decoding device (RW-CODEC) 9. The input image data is mapped on the internal buffer (CODEC_BUF), is compressed and encoded by the encoder (ENC) by a predetermined compression scheme, and is saved in the image memory (DRAM) 5 as an image file. At the same time, management information including, e.g., an accept number, destination information, the number of pages, the numbers of lines of the respective pages, the reading widths of the respective pages, image storage memory block information, and the like is stored in the RAM 3.

An operation for recording an image will be explained below. Encoded image data stored in the image memory (DRAM) 5 is decompressed and decoded by the decoder (DEC) in the reading/recording encoding/decoding device (RW-CODEC) 9, and is mapped as image data on the internal buffer (CODEC_BUF). The mapped image data is serially output from the printer (PRN), and is then subjected to correction and image conversion by the recording image processing circuit (CUTE) 15. After that, the processed image data is printed on a recording paper sheet by the laser printer (LBP) 13 under the control of the printer control circuit (LCNT) 14. In this embodiment, the CPU 1 can read the internal abnormality and the like of the laser beam printer (LBP) 13 as status data via the printer control circuit (LCNT) 14.

An operation for transmitting the read original image will be explained below. Encoded image data stored in the image memory (DRAM) 5 is decompressed and decoded by the decoder (DEC) in the communication encoding/decoding device (C-CODEC1) 16, and is mapped as image data on the internal buffer (CODEC_BUF). The mapped image data is subjected to reduction processing by the CPU 1 as needed, and is mapped again onto the internal buffer (CODEC_BUF). After that, the mapped image data is encoded as transmission data by the encoder (ENC) in the communication encoding/decoding device (C-CODEC1) 16, and the encoded data is transferred to the transmission buffer (RAM) 6. The transferred transmission data is output onto a line via the network control unit (NCU1) 19 in units of bytes by the modulator/demodulator (MODEM1) 18.

An operation for receiving an image will be explained below. After synchronization with a transmitter is established, reception data is input to the modulator/demodulator (MODEM1) 18 via the network control unit (NCU1) 19, is demodulated, and is then transferred to the reception buffer (RAM) 6 in units of bytes. The reception data transferred to the reception buffer (RAM) 6 is decompressed and decoded by the decoder (DEC) in the communication encoding/decoding device (C-CODEC1) 16, and is then mapped as image data on the internal buffer (CODEC_BUF) after its image errors are checked. The mapped image data is compressed and encoded by the internal encoder (ENC), and is stored in the image memory (DRAM) 5. At the same time, image management information is stored in the RAM 3.

Likewise, in this embodiment, the above-mentioned transmission/reception can be independently performed by another transmission/reception circuit (CODEC2, MODEM2, NCU2).

The operator of the facsimile apparatus can perform various setups, e.g., he or she can input the digits of a called number, start an original read, start or stop transmission, edit the contents of a line selection management table (to be described later), operate the apparatus, and so forth, by pressing the key (KEY) 8. At that time, the CPU 1 detects input data from the key (KEY) 8, and displays necessary data on the display (LCD) 7. The set contents are stored and held in the RAM 3.

Figure 2:
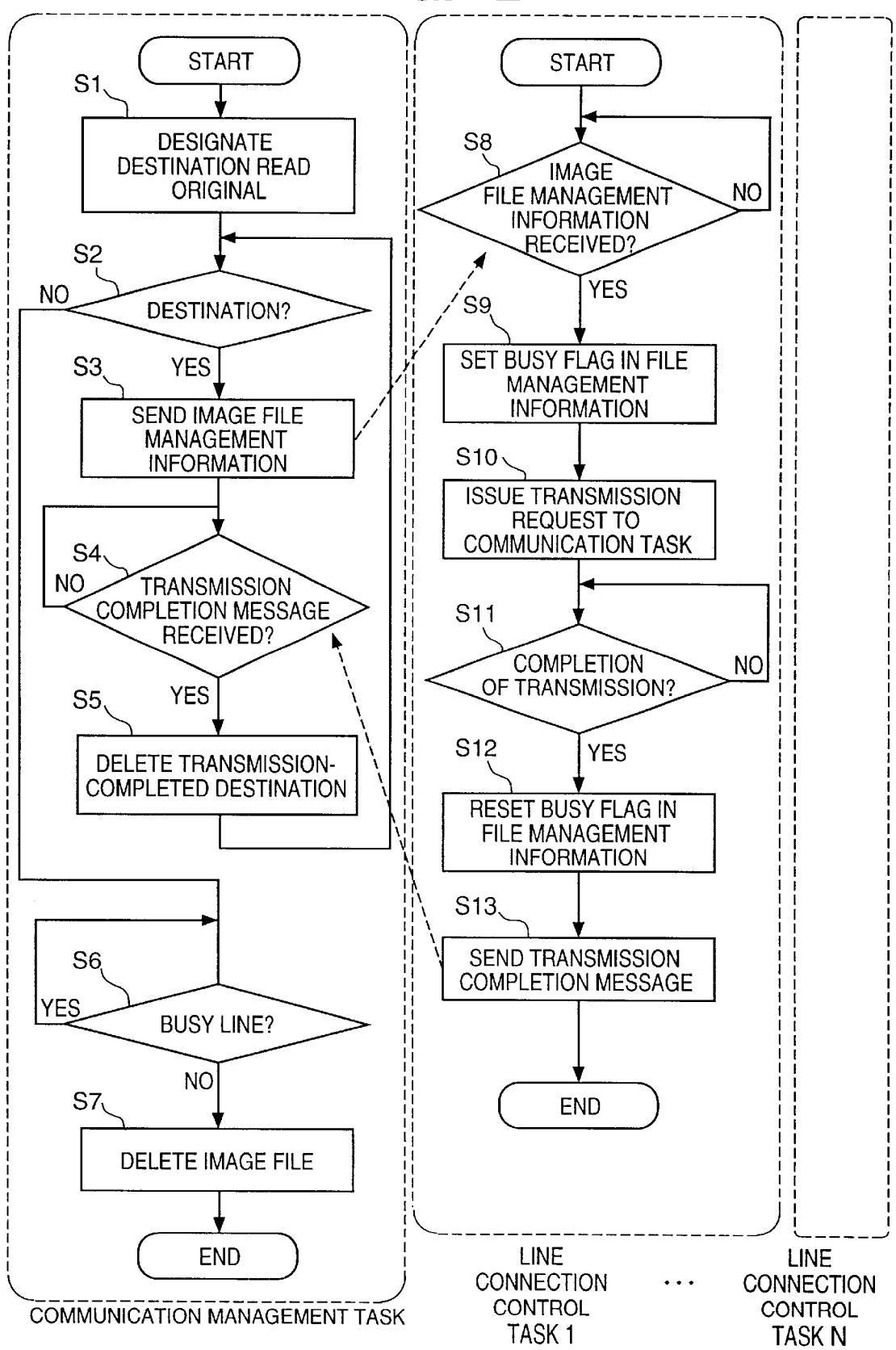
FIG. 2 is a flow chart showing the line connection control upon multicast transmission.

The logical arrangement of the CPU 1 and line connection control of each task implemented by the control program stored in the ROM will be explained below with reference to the flow chart shown in FIG. 2 and the logic table of image file management information shown in FIG. 3.

(1) The image file management information includes a destination data management table, a start address 302 of transmission data stored in the image memory (DRAM) 5, and a busy indication switch 303 including flags each indicating whether or not a corresponding line is busy, as shown in FIG. 3. The destination data management table 301 manages the destination names to which transmission is to be done, facsimile numbers, and the like in units of destinations, and has flag fields each indicating whether or not transmission has been done, in units of destinations.

(2) Structure of Image File Management Information and Operation of Communication Management Task When multicast transmission is instructed by multicast transmission operation by the operator using the operation key (KEY) 8, an OCR original with a plurality of designated destinations is read by the above-mentioned read operation (step S1), and the number of destinations to be referred to is registered in step S2 (to be described later). Upon completion of this operation, the control advances to step S3. In step S3, the states of the flags of the busy indication switch 303 in the image file management information are checked to enable an unoccupied line connection control task, and the control informs that line connection control task of the address of image file management information to be transmitted. With this information, the line connection control task reads out the address of an image file from the image data start address 302 with reference to the image file management information, and requests a communication task (not shown) to transmit the readout image data to a destination written in the destination data management table 301. Upon reception of a transmission normal completion message from the line connection control task (step S4), one destination to which the image data has been transmitted is deleted (step S5). If no more destination remains (step S2), and if all the flags of the busy indication switch 303 each indicating whether or not the corresponding line connection control task is busy in the image file management information are OFF (=0) (step S6), the image file and image file management information are deleted (step S7).

This embodiment has described only one line connection control task which receives the image file management information in step S3 for the sake of simplicity. Also, the image file management information is similarly supplied to the remaining ones of n lines. On the other hand, completion of transmission in step S4 can be detected in an arbitrary step by receiving a message using the function of the OS stored in the ROM 1 when transmission is instructed to a plurality of lines.

(3) Operation of Line Connection Control Task

Upon reception of the address of transmission file management information from a communication management task (step S8), each line connection control task turns on (=1) a busy indication flag corresponding to the own task to record start of transmission in a flag of data to be transmitted (step S9). The control advances to step S10. In step S10, the task informs a communication task (not shown) that performs actual communication control of the address of the image file management information and requests transmission. After that, upon reception of a completion message from the communication task (step S11), the task turns off (=0) the busy indication flag in the busy indication switch 303 of the image file management information (step S12), and informs the communication management task of the communication result (step S13).

Since line connection control tasks are provided in units of lines to be connected, they can perform asynchronous, parallel operations by the function of the OS stored in the ROM 1.

Figure 4:
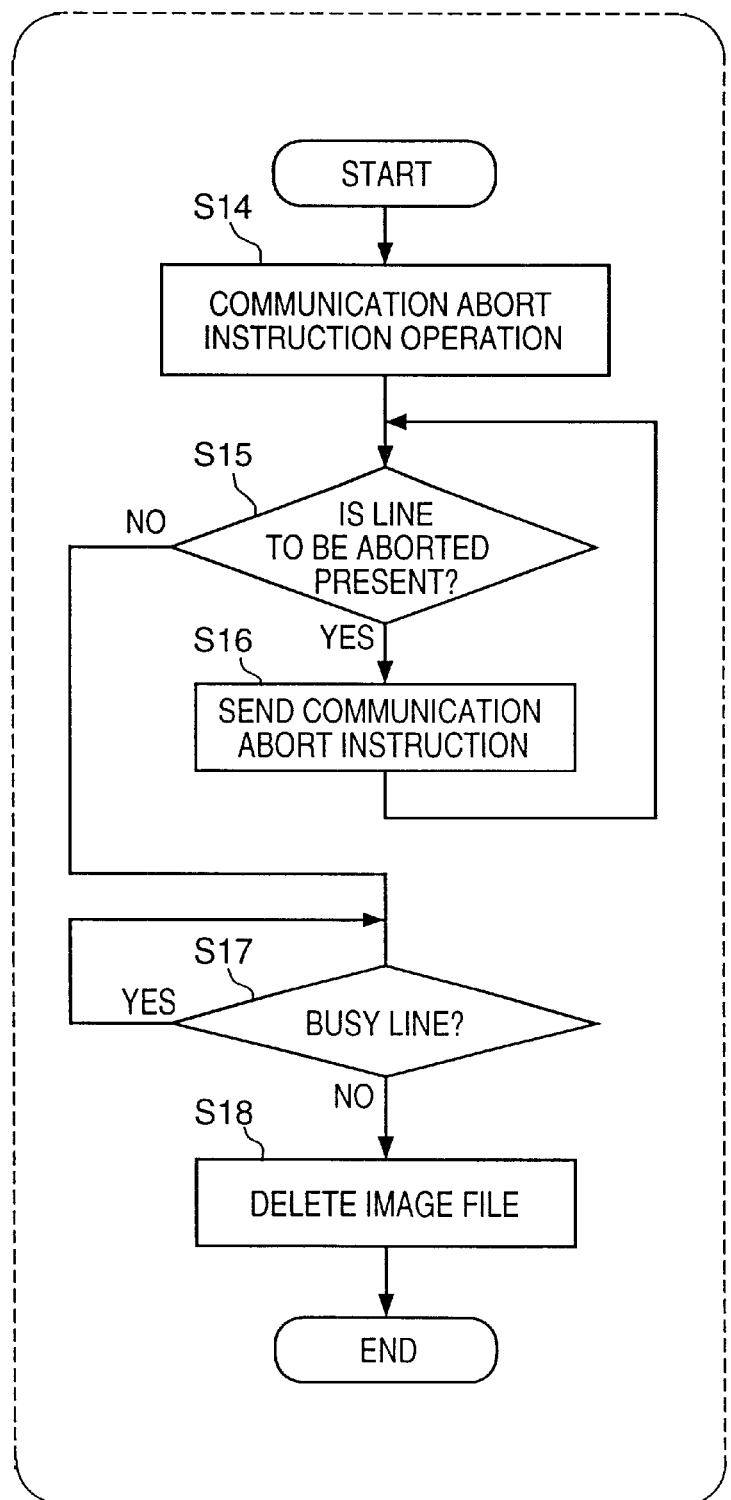
FIG. 4 is a flow chart showing the line connection control upon interrupting transmission in the first embodiment.

An operation upon interrupting transmission will be explained below with reference to the flow chart in FIG. 4.

When the operator instructs to abort communications by operation using the operation key (KEY) 8 (step S14), lines which are transmitting the designated image file are checked with reference to the image file management information (step S15), and a communication abort instruction is supplied to the line connection control tasks corresponding to the lines which are transmitting the image file (step S16). Upon reception of the instruction, each line connection control task instructs a communication task that is actually making communications to abort the communications, turns off (=0) the busy indication flag corresponding to the own task in the busy indication switch 303, and informs the communication management task of the communication result. After the instruction is sent to all the line connection control tasks, if all the flags in the busy indication switch 303 each indicating whether or not the corresponding line connection control task is busy in the image file management information are OFF (=0) (step S17), the image file and image file management information are deleted (step S18).

Figure 5:
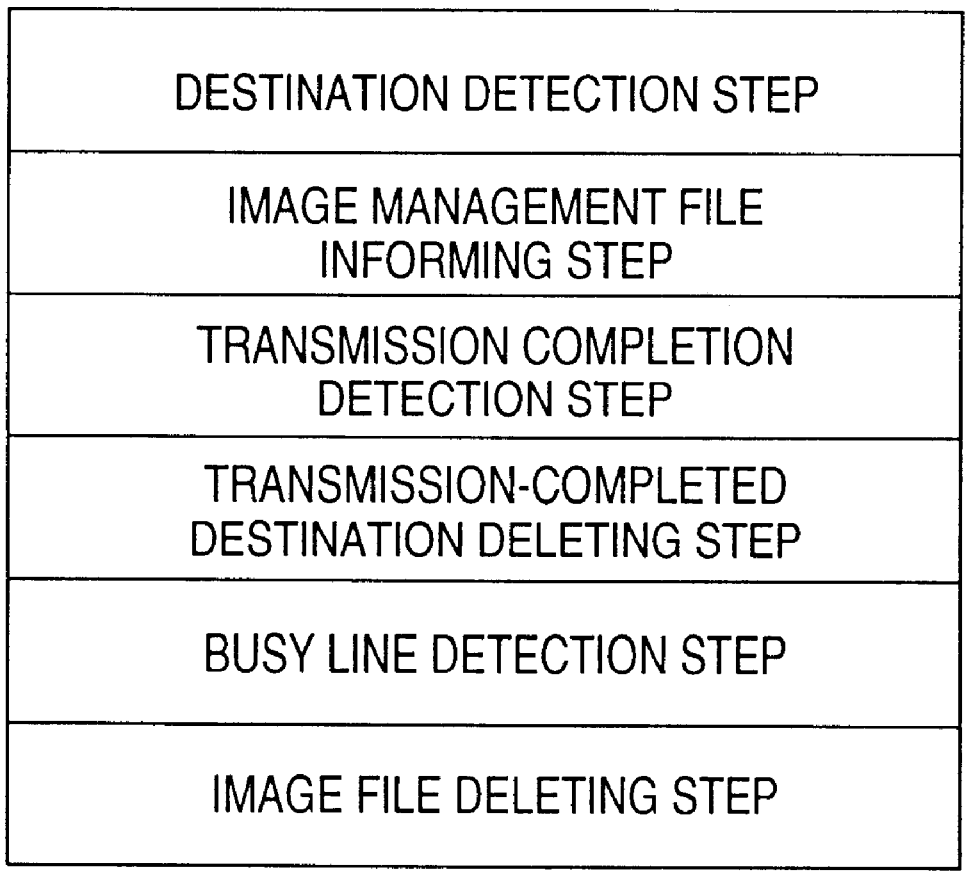
FIG. 5 is a logic table of a line connection control program in a recording medium in the first embodiment.

Note that the aforementioned communication management task program is stored in a recording medium such as a ROM or the like, as shown in FIG. 5.

Second Embodiment

In the first embodiment described above, the processing for transmitting a single image file has bee described. In the second embodiment, processing for transmitting a plurality of image files will be explained.

Figure 6:
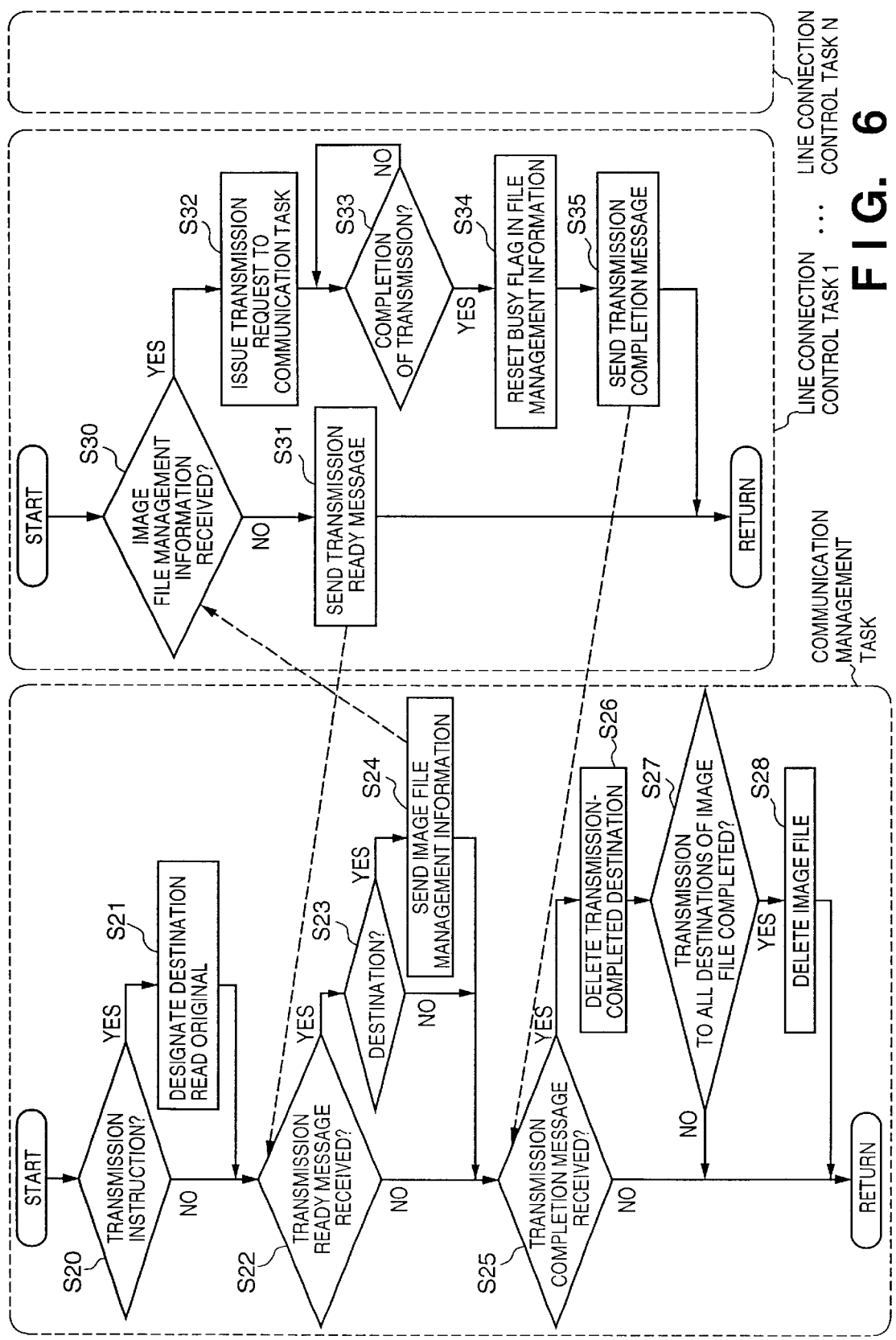
FIG. 6 is a flow chart showing the processing for transmitting a plurality of image files according to the second embodiment of the present invention.

FIG. 6 is a flow chart showing the processing of a communication management task and line connection control task according to the second embodiment.

The communication management task in FIG. 6 manages a plurality of files. In this example, assume that the apparatus has four transmission/reception circuits. Hence, the number of lines that can be used at the same time is four. Also, four line connection control tasks are present.

Assume that the user instructs transmission of the first file (to be referred to as image file 1 hereinafter) (step S20). The communication management task reads an original and stores image data in the image memory 5 in step S21. Also, the task forms image file management information 1 for image file 1 and stores it in the RAM 3.

Figure 7:
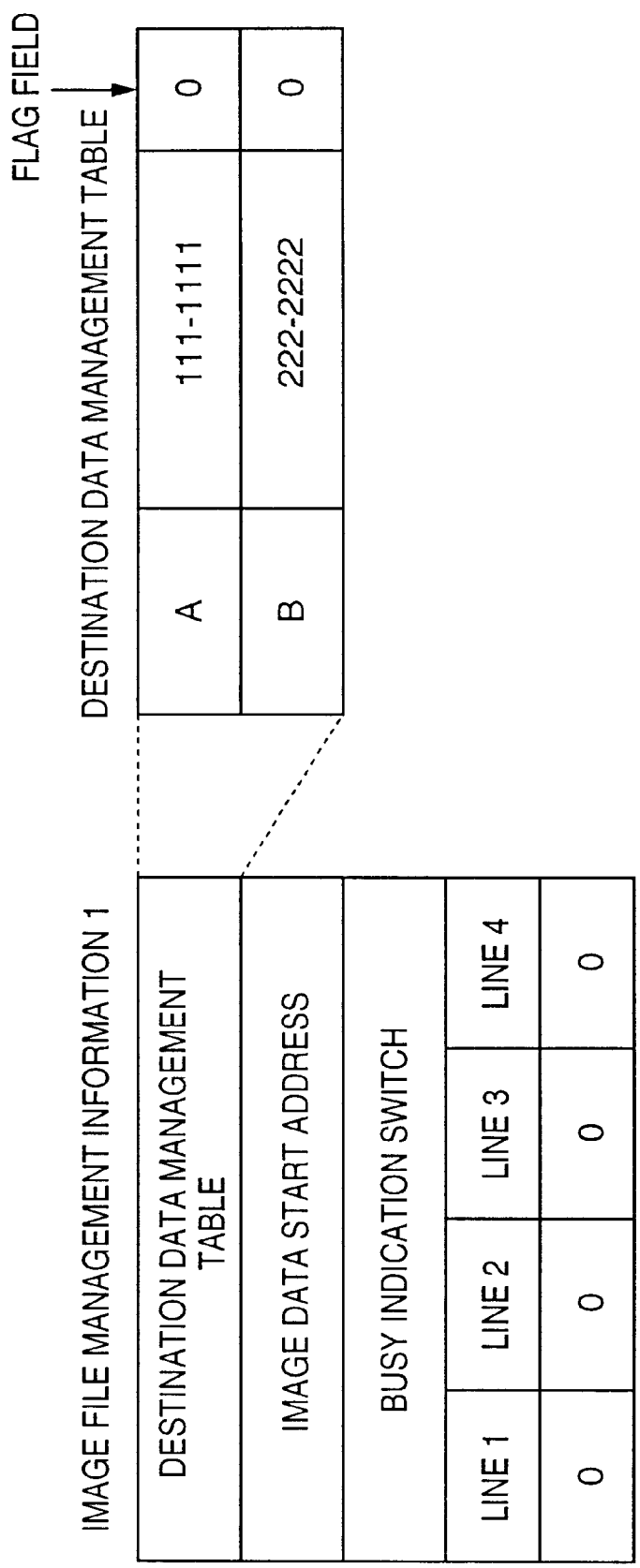
FIG. 7 shows tables that indicate the state of image file management information 1 upon transmitting image file 1.

FIG. 7 shows the state of the image file management information at that time. FIG. 7 includes, as destinations of image file 1, destination name A (FAX number 111-1111) and destination name B (FAX number 222-2222). Since transmission to these destinations A and B is not started yet, the flag fields of both destinations A and B in a destination data management table are "0".

Assume that none of the four transmission/reception circuits are executing communications. When each line connection control task is not making any communications, it periodically informs the communication management task of its ready state for the next communication (step S31). In response to this information, the communication management task checks in step S23 if the destination data management table includes a destination with a flag field=0. Since the flag of destination A is "0", the flow advances to step S24. The communication management task selects one of unoccupied line connection control tasks 1, 2, 3, and 4, and informs the selected line connection control task of image file management information to be transmitted (step S24). If line connection control task 1 is selected, the communication management task informs line connection control task 1 of the image data start address and the FAX number of destination A on the basis of the image file management information in step S24. Then, the task sets the flag in the flag field of destination A in the destination data management flag at "1". Also, the task sets a flag indicating if line 1 is busy at "1".

The communication management task checks in step S25 if it has received a transmission completion message from any of the line connection control tasks. If a transmission completion message is received, the flow advances to step S26; otherwise, the flow returns to step S20.

Then, the communication management task receives transmission ready messages from line connection control tasks 2, 3, and 4 in step S22. Since the task finds destination B has a flag field=0 in the destination data management table in image file management information 1 in step S23, the flow advances to step S24.

In step S24, the communication management task informs line connection control task 2 of the image data start address and FAX number of destination B in the same manner as in the processing for destination A, and also sets the flag of destination B at "1" and the flag of line 2 at "1".

Figure 8:
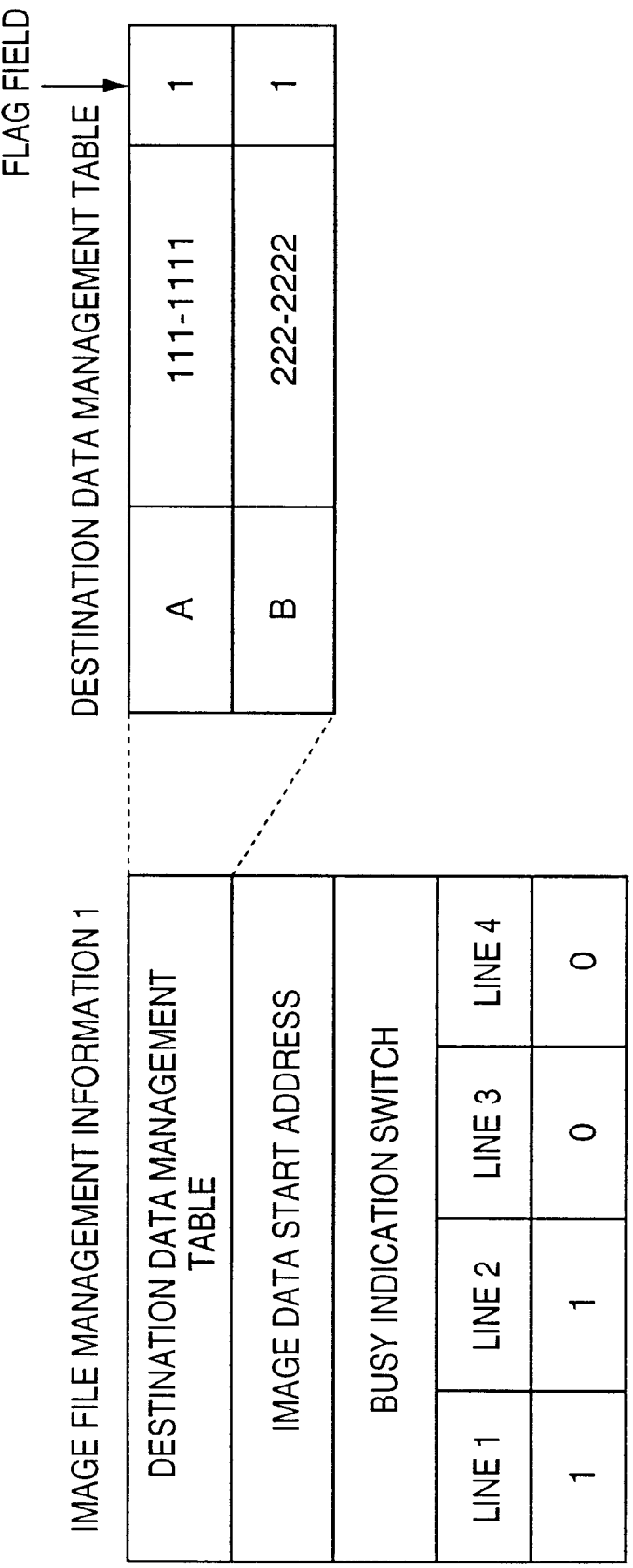
FIG. 8 shows tables that indicate the state of image file management information 1 during transmission of image file 1.

FIG. 8 shows the state of the image file management information upon completion of the processing described above.

Assume that the user instructs transmission of the second file (to be referred to as image file 2 hereinafter) during transmission of image file 1 (step S20). The communication management task reads an original and stores image data in the image memory 5 in step S21. Also, the task generates image file management information 2 for image file 2, and stores it in the RAM 3. The destinations of image file 2 are destination name C (FAX number 333-3333) and destination name D (FAX number 444-4444). Since transmission to these destinations C and D is not started yet, the flag fields of both destinations C and D in the destination data management table are "0".

Figure 9:
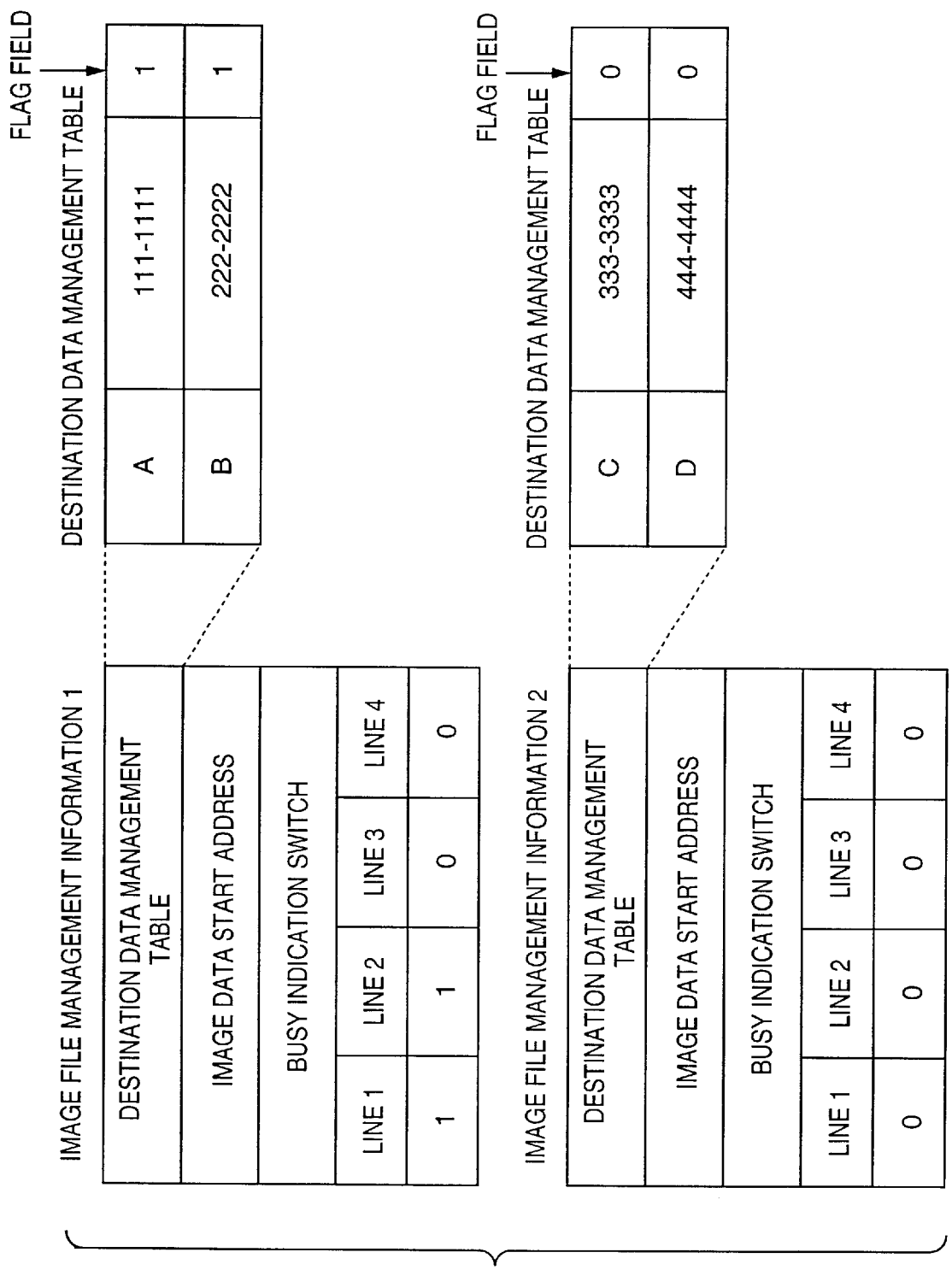
FIG. 9 shows tables that respectively indicate the states of image file management information 1 and image file management information 2 upon transmitting image file 2.

FIG. 9 shows the state of the image file management information upon completion of the processing described above.

The communication management task receives transmission ready messages from line connection control tasks 3 and 4 (step S22). Since the task finds destination C with a flag field=0 in the destination data management table in image file management information 2 in step S23, the flow advances to step S24.

The communication management task selects line connection control task 3, and informs line connection control task 3 of the image data start address and FAX number of destination C on the basis of image file management information in step S24. The task sets the flag in the flag field of destination C in the destination data management table at "1", and also sets the flag indicating if line 3 is busy at "1".

Upon reception of a transmission ready message from line connection control task 4 in step S22, the communication management task advances to step S24 since it detects destination D with a flag field=0 in the destination data management table of image file management information 2 (YES in step S23).

The communication management task informs line connection control task 4 of the image data start address and FAX number of destination D in the same manner as in the processing for destination C, and also sets the flag of destination D at "1" and the flag of line 4 at "1".

FIG. 10 shows the state of image file management information upon completion of the processing described above.

The processing of each of line connection control tasks 1, 2, 3, and 4 will be explained below.

The line connection control task checks in step S30 if it has received image file management information from the communication management task. If NO in step S30, the task sends a transmission ready message to the communication management task in step S31, and the flow returns to step S30.

If it is determined in step S30 that the line connection control task has received image file management information from the communication management task, the task informs a communication task (not shown) of the image data start address to issue a transmission request in step S32. Upon reception of a transmission completion message of image data from the communication task in step S33, the task sets a busy flag of the own line connection control task in the file management information at "0" in step S34, and informs the communication management task of the number of the image file management information and the destination (e.g., the FAX number of the destination) to which image data has been transmitted (step S35).

Upon reception of a transmission completion message from each line connection control task in step S25, the communication management task advances to step S26.

Figure 11:
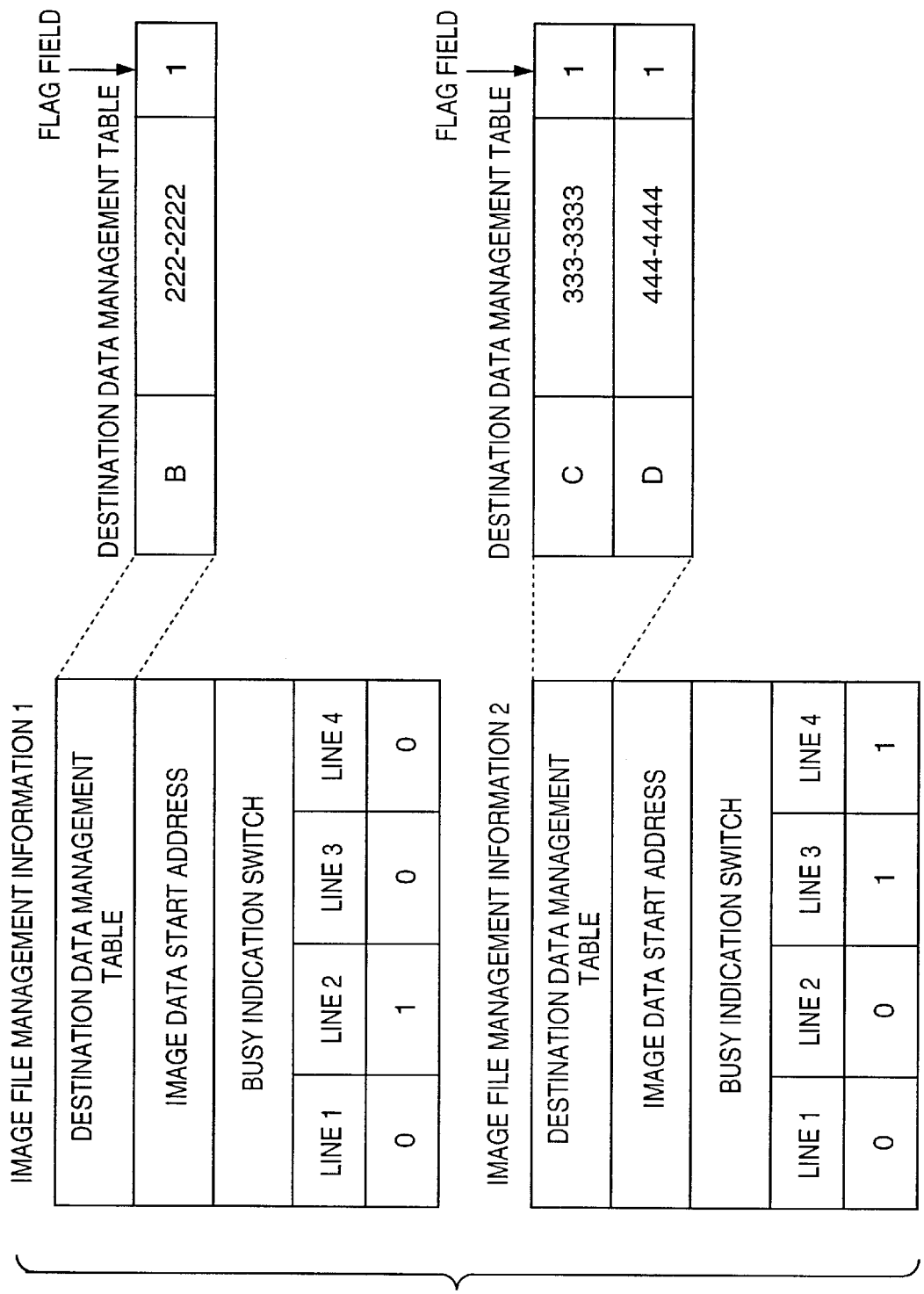
FIG. 11 shows tables that respectively indicate the states of image file management information 1 and image file management information 2 upon completion of transmission for destination A.

In step S26, the communication management task deletes the destination corresponding to the transmission completion message from the destination data management table of the corresponding image file management information. FIG. 11 shows the state of image file management information upon completion of transmission to destination A in image file management information 1.

The communication management task checks in step S27 if transmission to all the destinations included in the image file management information from which one destination has been deleted in the previous step is complete. This step can be achieved by checking if all the destinations included in the image file management information are deleted. If YES in step S27, the corresponding image file is deleted from the image memory 5 and the image file management information is deleted from the RAM 3 in step S28. FIG. 12 shows the state of image file management information upon completion of transmission to all the destinations in image file management information 1.

A case will be explained below wherein key operation for stopping transmission has been made.

Figure 13:
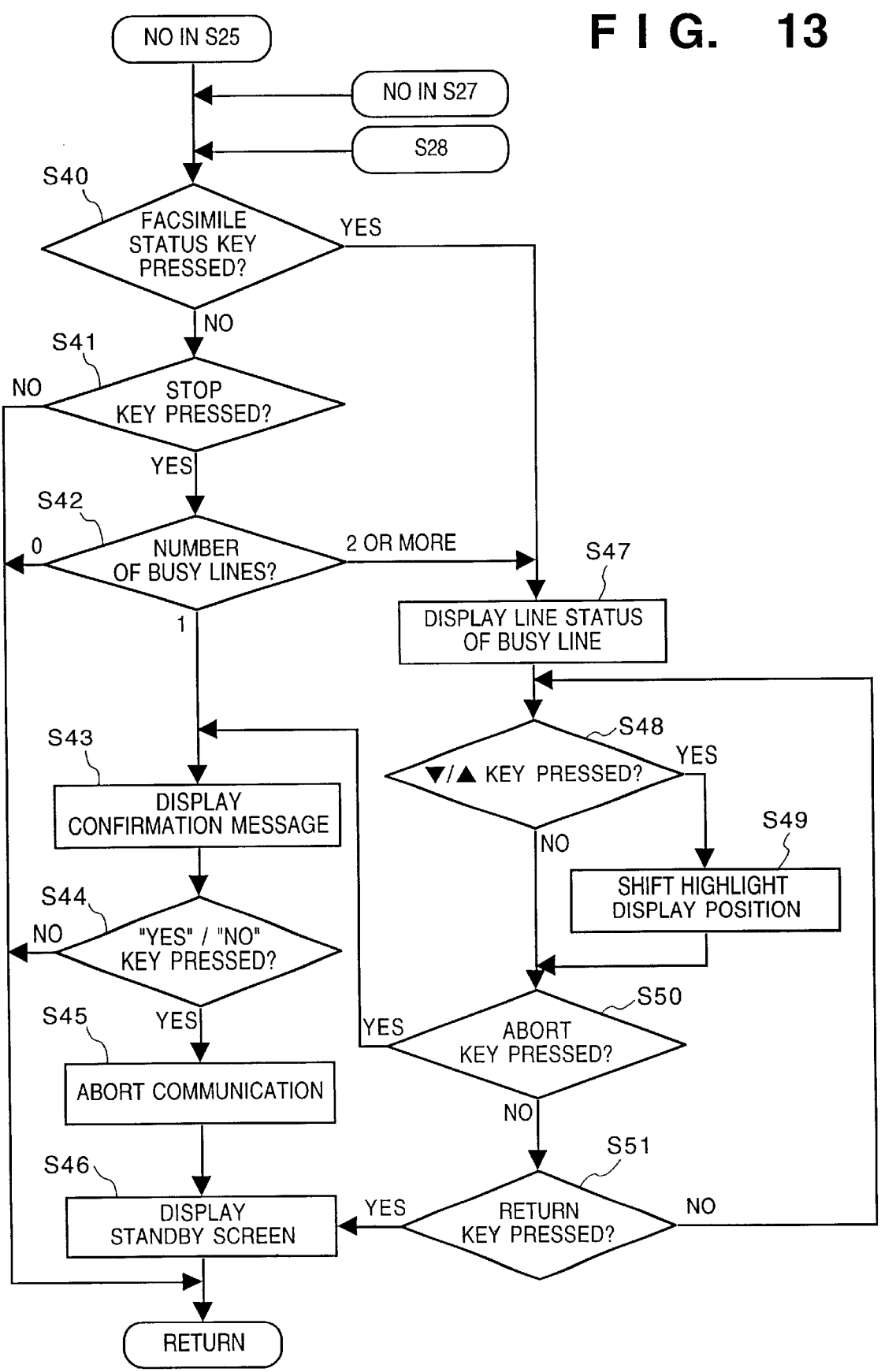
FIG. 13 is a flow chart showing the processing for aborting communications during communications.

FIG. 13 shows the processing executed after FIG. 6. It is checked in step S40 if a facsimile status key has been pressed. If YES in step S40, the line statuses of busy lines are displayed in step S47, as shown in FIG. 15. FIG. 15 shows the display of the line states in FIG. 10.

It is checked in step S41 if a stop key has been pressed. If YES in step S41, the number of busy lines is checked, and if the number of busy lines is 0, the flow returns to step S20 in FIG. 6; if it is 1, the flow advances to step S43; or if it is 2 or more, the flow advances to step S47.

After the display is made in step S47, it is checked in step S48 if a ∨ or ∧ key has been pressed. If either key has been pressed, the character highlight display position shown in FIG. 15 is shifted downward or upward. Note that the display 7 also serves as a touch panel.

If it is determined in step S48 that neither the ∀ key nor ∆ key have been pressed, it is checked in step S50 if an abort key has been pressed. If YES in step S50, the flow advances to step S43; otherwise, the flow advances to step S51 to check if a return key (included in the operation key 8) has been pressed. If YES in step S51, the flow advances to step S46; otherwise, the flow advances to step S48.

In step S43, a confirmation message shown in FIG. 16 is displayed on the display 7.

It is then checked in step S44 if either a "YES" or "NO" key has been pressed. If the "YES" key has been pressed, the flow advances to step S45; if the "NO" key has been pressed, the flow returns to step S20 in FIG. 6.

Figure 14:
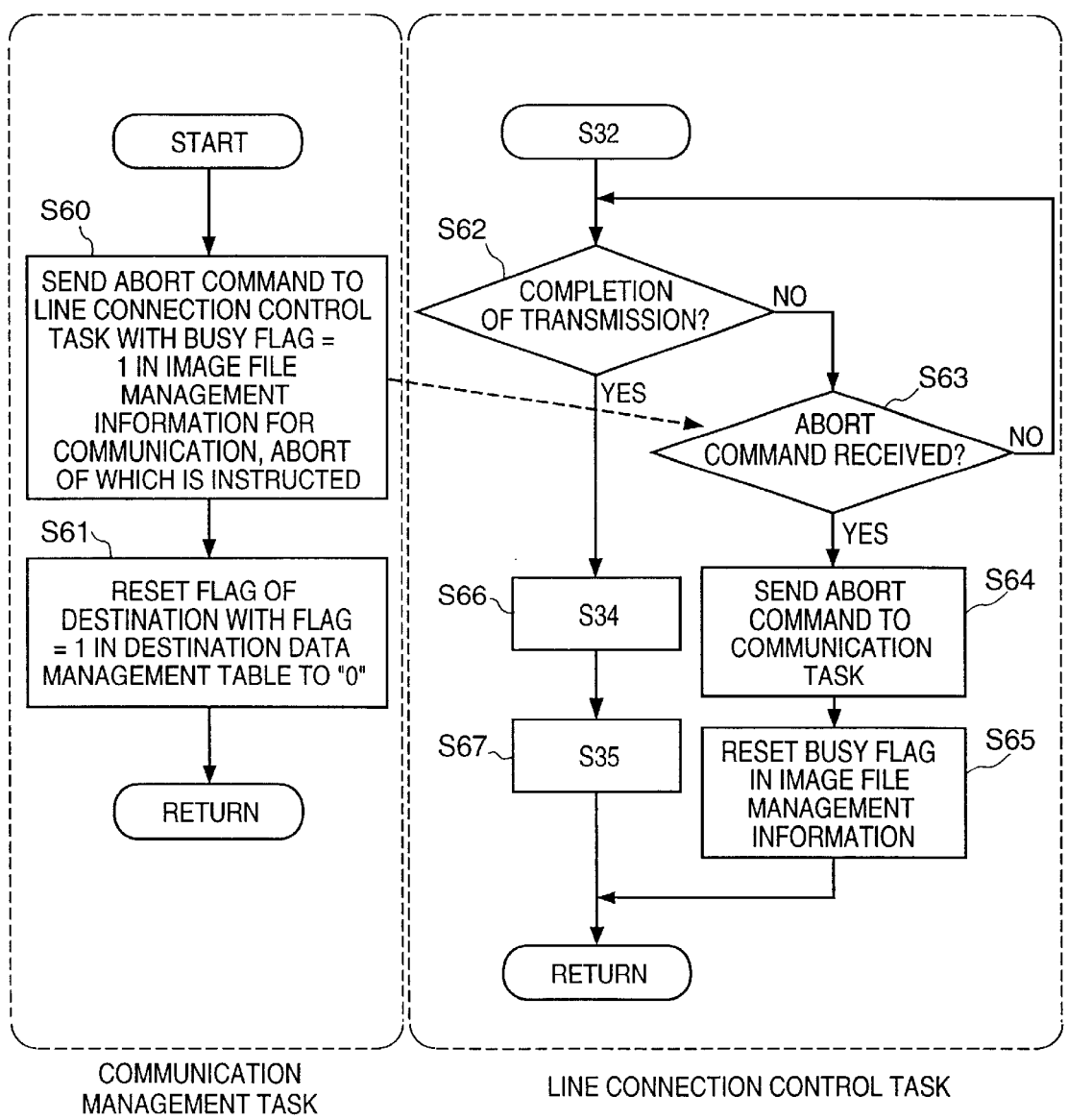
FIG. 14 is a flow chart showing the communication abort processing in step S45 shown in FIG. 13 in detail.

In step S45, processing shown in FIG. 14 (to be described later) is executed.

In step S46, a standby screen (not shown) is displayed, and the flow returns to step S20 in FIG. 6.

The processing executed in step S45 will be explained below with reference to FIG. 14.

In step S60, the communication management task sends a communication abort command to the line connection control task with a busy flag=1 in the image file management information corresponding to a communication, abort of which is instructed in step S44. If the flow advances from the state shown in FIG. 15 in the order of steps S50, S43, S44, and S45, since the user has instructed to abort the communication for destination A, the communication management task hunts for line connection control tasks with busy flags=1 in image file management information 1 shown in FIG. 10. In FIG. 10, since the busy flags of lines 1 and 2 are "1", the communication management task sends an abort command to line connection control tasks 1 and 2.

In step S61, the communication management task sets the flags of the destinations with flags=1 in the destination data management table at "0", and the flow then advances to step S46 in FIG. 13. FIG. 17 shows this state. Since the user has instructed to abort the communication with destination A, a communication with destination B to which the same image file has been transmitted is also aborted. However, since another image file is transmitted to destinations C and D, communications for these destinations are not aborted.

The processing of the line connection control task upon reception of an abort command from a communication management task will be explained below.

After step S32 in FIG. 6, the line connection control task checks in step S62 if a transmission completion message is received from a communication task, and also checks in step S63 if an abort command is received from the communication management task. If it is determined in step S62 that a transmission completion message is received, the task sets the corresponding busy flag in the image file management information at "0" in step S66, and informs the communication management task of completion of transmission in step S67.

If it is determined in step S63 that the task has received an abort command, the flow advances to step S64, and the task sends an abort command to a communication task (not shown). In step S65, the task sets the corresponding busy flag in the image file management information at "0" in step S65. Then, the flow returns to step S30 in FIG. 6.

Other Embodiments

In the above description, a facsimile apparatus has been exemplified. Also, the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium such as a floppy disk or the like stores program codes corresponding to the above-mentioned flow charts. For example, the modules shown in a memory map example shown in FIG. 5 are stored in the storage medium. More specifically, the storage medium can store program codes of modules that respectively implement at least the destination detection step, image management file informing step, transmission completion detection step, transmission-completed destination deleting step, busy line detection step, and image file deleting step.

To restate, according to the above embodiments, upon simultaneously transmitting identical data to a plurality of destinations, since a plurality of line control means prepared in units of lines independently make data communications with reference to transmission management means commonly used by these line control means, data communication efficiency can be improved.

Also, according to the above embodiments, the facsimile main body has a plurality of line connection control devices, and upon connecting individual lines, line statuses are written in management information of an image file to be transmitted. Upon completion of transmission to all the destinations, or upon generation of a deletion request of an image file by, e.g., a transmission abort request by the operator, the image file is deleted after it is confirmed by checking the image file management information that communications via all the lines are complete. Hence, an identical image file can be asynchronously and parallelly transmitted using a plurality of lines without deleting the image file during transmission of an image, and efficient multicast transmission can be achieved by the facsimile main body alone.

As many apparently widely different embodiments of the present invention can be made without departing from the spirit and scope thereof, it is to be understood that the invention is not limited to the specific embodiments thereof except as defined in the appended claims.

What is claimed is:

1. A data communication apparatus comprising:

connection means for connecting a plurality of lines;

a plurality of line control means for executing a plurality of tasks allocated to the plurality of lines respectively, each of the plurality of tasks performing asynchronous, parallel communication with a destination; and management means for managing data communication with a plurality of destinations performed by the plurality of tasks, wherein each of the plurality of tasks transmits an image file as the data communication, wherein said management means manages at least one of a plurality of image files to be transmitted to the plurality of destinations, and wherein said management means includes a table for managing the plurality of destinations and manages the table so as to delete a destination for which transmission has been completed.

2. The apparatus according to claim 1, wherein the table includes at least one of the plurality of destinations, the image file start address and a status indicating an active state of the plurality of tasks.

3. The apparatus according to claim 2, wherein when the status indicates an active state of at least one of the plurality of tasks, deletion of the image file is inhibited.

4. The apparatus according to claim 3, wherein when a communication abort instruction is designated to a task which is transmitting an image file, the designated task is aborted, and other tasks which are transmitting the image file are automatically aborted.

5. The apparatus according to claim 4, wherein when the task which is transmitting an image file is aborted, abort processing is executed for all tasks which are transmitting the image file, and after that, the image file is deleted from a memory.

6. The apparatus according to claim 3, wherein when a plurality of image files is being transmitted by the plurality of tasks, information indicating that each image file is being transmitted is written in said management means corresponding to each image file, and when a deletion request of each image file is generated, each image file is deleted after it is confirmed that none of the tasks are busy.

7. A data communication method comprising the steps of:

connecting a plurality of lines;

executing a plurality of tasks allocated to the plurality of lines respectively, each of the plurality of tasks performing asynchronous, parallel communication with a destination; and managing data communication with a plurality of destinations performed by the plurality of tasks, wherein each of the plurality of tasks transmits an image file as the data communication, wherein in said managing step a single image file is managed to be transmitted to the plurality of destinations, and wherein in said managing step a table for managing the plurality of destinations is managed so as to delete a destination for which transmission has been completed.

8. The method according to claim 7, wherein the table includes at least one of the plurality of destinations, the image file start address and a status indicating an active state of the plurality of tasks.

9. The method according to claim 8, wherein when the status indicates an active state of at least one of the plurality of tasks, deletion of the image file is inhibited.

10. The method according to claim 9, wherein when a communication abort instruction is designated to a task which is transmitting an image file, the designated task is aborted, and other tasks which are transmitting the image file are automatically aborted.

11. The method according to claim 10, wherein when the task which is transmitting an image file is aborted, abort processing is executed for all tasks which are transmitting the image file, and after that, the image file is deleted from a memory.

12. The method according to claim 9, wherein when a plurality of image files is being transmitted by the plurality of tasks, information indicating that each image file is being transmitted is written in said management means corresponding to each image file, and when a deletion request of each image file is generated, each image file is deleted after it is confirmed that none of the tasks are busy.

13. A computer-readable storage medium storing a program executed by a computer for implementing a data communication method, the program comprising:

code for connecting a plurality of lines;

code for executing a plurality of tasks allocated to the plurality of lines respectively, each of the plurality of tasks performing asynchronous, parallel communication with a destination;

code for managing data communication with a plurality of destinations performed by the plurality of tasks; and code for deleting the image file upon completion of the communication.

14. The storage medium according claim 13, wherein the program further comprises:

code for detecting a busy task, and code for inhibiting the image file from being deleted when the busy task is detected.

15. A data communication apparatus comprising:

connection means for connecting a plurality of lines; and a plurality of line control means for executing a plurality of tasks allocated to the plurality of image files respectively, each of the plurality of tasks performing asynchronous, parallel communication with a destination, wherein when an abort instruction is designated to at least one destination while each of the plurality of tasks performs asynchronous, parallel communication to a plurality of image files, the task which performs the communication to the designated destination is aborted, but the other tasks are not aborted.

16. The apparatus according to claim 15, wherein each of the plurality of image files is transmitted to a plurality of destinations.

17. A data communication apparatus comprising:

a plurality of line control means; and transmission management means, wherein said plurality of line control means, prepared in units of lines, independently makes data transmission with reference to said transmission management means, which is commonly used by said plurality of line control means upon simultaneously transmitting identical data to a plurality of destinations, and wherein, when a communication abort instruction is inputted from operation means, a communication using a designated line is aborted, and, when a corresponding image file is being simultaneously transmitted to another destination using another line, all other corresponding communications via one or more of said plurality of lines are automatically aborted.

* * * * *

UNITED STATES PATENT AND TRADEMARK OFFICE
CERTIFICATE OF CORRECTION

PATENT NO. : 6,476,935 B1
DATED : November 5, 2002
INVENTOR(S) : Toru Fujino

It is certified that error appears in the above-identified patent and that said Letters Patent is hereby corrected as shown below:

<u>Title page,</u>
Item [56], References Cited, FOREIGN PATENT DOCUMENTS,
"05136906" should read -- 5-136906 --.
"05227403" should read -- 5-227403 --.

<u>Column 6,</u>
Line 39, "bee" should read -- been --.

<u>Column 9,</u>
Line 4, "have" should read -- has --.

Signed and Sealed this

Twenty-second Day of April, 2003

JAMES E. ROGAN
*Director of the United States Patent and Trademark Office*